United States Patent [19]
Yamaguchi

[11] Patent Number: 6,051,900
[45] Date of Patent: Apr. 18, 2000

[54] FLAT CORELESS VIBRATOR MOTOR HAVING NO OUTPUT SHAFT

[75] Inventor: Tadao Yamaguchi, Isesaki, Japan

[73] Assignee: Tokyo Parts Industrial Co., Ltd., Isesaki, Japan

[21] Appl. No.: 09/365,836

[22] Filed: Aug. 3, 1999

[51] Int. Cl.[7] ................................................ H02K 7/06
[52] U.S. Cl. ............................................. 310/81; 310/261
[58] Field of Search ........................... 310/81, 237, 261, 310/268; 340/407.1

[56] References Cited

U.S. PATENT DOCUMENTS

| | | | |
|---|---|---|---|
| 4,864,276 | 9/1989 | Tribbey et al. | 340/407.1 |
| 5,036,239 | 7/1991 | Yamaguchi | 310/81 |
| 5,175,459 | 12/1992 | Danial et al. | 310/81 |
| 5,793,133 | 8/1998 | Shiraki et al. | 310/81 |
| 5,942,833 | 8/1999 | Yamaguchi | 310/268 |
| 6,011,333 | 1/2000 | Yamaguchi et al. | 310/81 |

FOREIGN PATENT DOCUMENTS

| | | |
|---|---|---|
| 59-14966 | 4/1984 | Japan . |
| 6-81443 | 10/1984 | Japan . |
| 404046542 | 2/1992 | Japan . |
| 404168950 | 7/1992 | Japan . |

*Primary Examiner*—Nestor Ramirez
*Assistant Examiner*—Joseph Waks
*Attorney, Agent, or Firm*—Leydig, Voit & Mayer, Ltd.

[57] ABSTRACT

One end of a shaft is fixed to a first portion of a housing. An eccentric rotor is located in the housing rotatably on the shaft. The other end of the shaft is fitted into a concave portion on a second portion of the housing, so the rotor may be assembled in the housing in a simple manner and radial movement of the shaft can be prevented without enlarging the fixing portion of the shaft. Even if the diameter of the shaft is small, the shaft can withstand an impact resulting from dropping of the motor.

16 Claims, 6 Drawing Sheets

FLAT CORELESS VIBRATOR MOTOR HAVING NO OUTPUT SHAFT

BACKGROUND OF THE INVENTION

1. Field of the Invention

The present invention relates to a flat coreless vibrator motor having no output shaft, which motor is suitable used as a silent information source for a small-sized radio calling device (or a pager) or as a vibration source for a massager and, more particularly, to an improved fixed shaft type structure of the coreless vibrator motor provided with a thin fixed shaft.

2. Description of the Related Art

Conventionally, a flat vibrator motor without an output shaft has been known, especially as a flat coreless motor disclosed in the U.S. Pat. No. 5,036,239. As shown in FIG. 6, this motor has the structure wherein a rotor R is eccentrically disposed within a housing H comprised of a casing 28 and a bracket 29 and rotatably supported by a lubricant-containing bearing 32 and 33 disposed in the casing 28 and the bracket 29, respectively, through a rotor holder 30 and a shaft 31. It should be noted that since the eccentric rotor R is fixed to the shaft 31, the position of the rotor R is determined by the shaft 31 which is flush with the housing H.

However, where the motor is of the above-described twin bearing type, the concentricity between the upper and the lower bearings becomes important. In the case of a coin type flat motor whose thickness is about 3 mm, in order to prevent the tilting and blocking of the rotor, it becomes necessary to make the concentricity between the bracket fitting portion and each of the bearings as small as 10 μm or less, so that each of the parts of the motor is required to have a high degree of dimensional accuracy.

Such a problem ought to be solved by using only one of the bearings as a cantilever type bearing, however, as will be understood from the thickness of the motor, the soft lubricant-containing bearing is not practical in use because of the weakness of its fixing strength. When the bearing fitting portion is elongated, the thickness of the motor can not be reduced. When the thickness is forced to be reduced, in turn, the fitting allowance of the rotor holder fitted about the shaft becomes short, resulting in another problem in the actual use thereof.

Further, there is also disclosed in JP-B-59-14966 (refer to FIG. 1) a shaft-fixed type vibrator motor in which the shaft is prevented from projecting outside its housing.

As maybe understood from its drawings, however, since both ends of the shaft are fixed to a bracket, it is difficult to assemble the rotor. That is, to explain the structure by using the reference numerals given in the drawings, it is generally difficult to mount the rotor 12 to the bearings 5 and 6 respectively fitted in the brackets 2 and 3 through the shaft 4 supporting brackets 10 and 11, because of the existence of the stator 7 as an obstacle. Further, the bearings 5 and 6 are not to be mounted to the shaft 4 but unavoidably mounted to the brackets 2 and 3 for the purpose of facilitating the lead wire connection process. Thus, the outer diameter of the bracket is obliged to be made large, so that the sliding loss with respect to the shaft-supporting brackets 10 and 11 becomes too large for the motor to be put in practical use. Unlike the shaft, the degree of roughness of the brackets 10 and 11 cannot be made small.

In this connection, in order to overcome the above-described various problems, the present inventors formerly proposed an invention disclosed in JP-B-6-81443 by taking notice of the fact that a vibrator motor having no output shaft which makes use of the vibration of its rotor itself is not required to rotate its shaft and that the shaft has only to be fixed at one end thereof. Thus, this motor has now been produced as a shaft-fixed type flat vibrator motor having no output shaft. Such a motor is now popular in the market due to the ease of assembly of the rotor and the excellence of its cost performance.

With the recent trend of miniaturization of portable equipment, the motor to be mounted in the equipment is required to be more and more miniaturized with minimum power consumption. If a motor with a shaft having a diameter of about 0.6 mm (a shaft having a diameter of 1.2 mm might be accepted) must be used, such a small-diameter shaft of cantilever supporting type may require careful consideration to its impact resistance making the fixing portion of the shaft large, in turn, may affect adversely the reduction of the overall thickness of the motor.

The present invention has been made to overcome the above-described problems and an object of the invention is to provide a flat vibrator motor having no output shaft with a sufficient degree of impact resistant, using a small-diameter shaft, which can be assembled in a simple manner and which is thereby advantageous in view of manufacturing cost.

SUMMARY OF THE INVENTION

In a vibrator motor having no output shaft and constructed such that an eccentric rotor comprising a plurality of armature coils is disposed within a housing comprised of a casing and brackets, a commutator is disposed on the rotor, brushes are brought into sliding contact with the commutator, a magnet is caused to confront the rotor leaving a space from the latter and a shaft supporting the rotor is prevented from projecting outside the housing, an improvement is made in such a manner that one end of the shaft is fixed to a portion of the housing, the rotor is rotatably mounted on the shaft by assembling the rotor in the housing from the other end of the shaft, the rotor is brought into sliding contact with the housing by urging the rotor forward or rearward in the axial direction and the other end of the shaft is fitted into a concave portion formed in the other portion of the housing thereby preventing the shaft from moving in the radial direction.

DETAILED DESCRIPTION OF PREFERRED EMBODIMENTS

Figure 1:
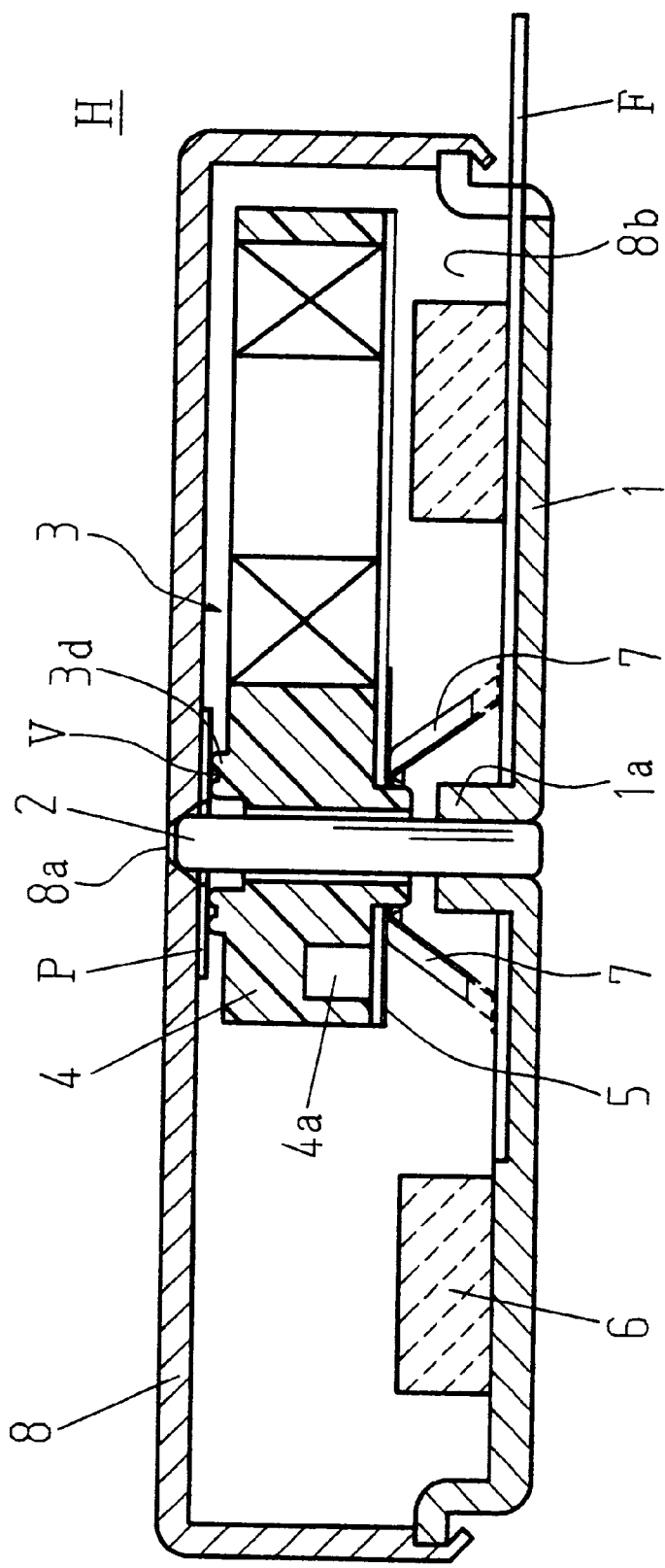
FIG. 1 is a sectional view of an essential portion of a flat vibrator motor having no output shaft according to a first embodiment of the present invention especially when the motor has a coreless type eccentric rotor.

The first embodiment of the present invention is an application of the invention to a flat coreless vibrator motor shown in FIG. 1 the motor includes a thin stainless steel shaft 2 is fixed to the center of a bracket 1 forming part of a housing H by pressure-fitting one end of the shaft into a holder 1a projecting inward as an integral part of the bracket 1 an eccentric rotor 3 is rotatably mounted on the shaft 2 from the open end of the shaft.

Figure 2:
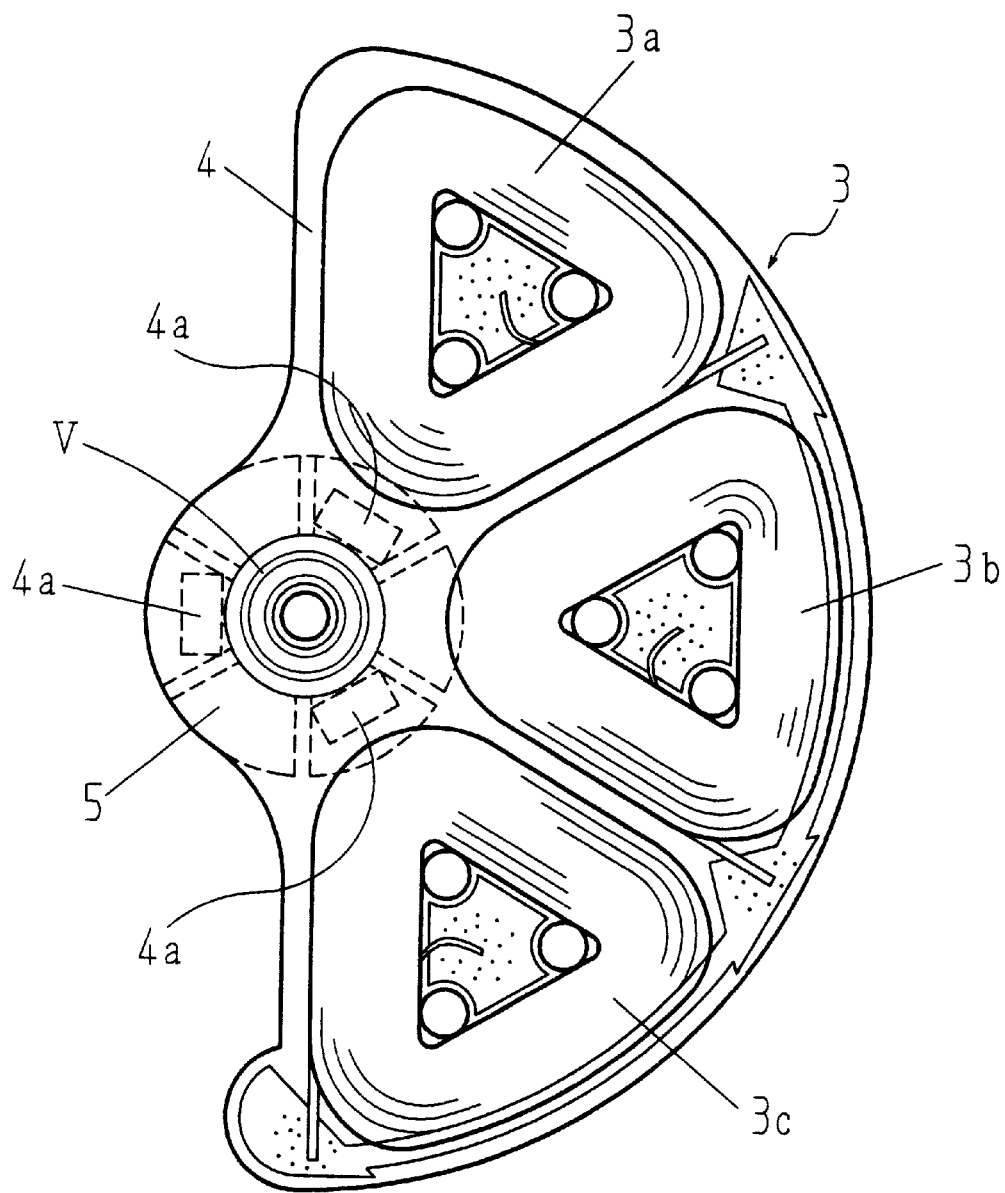
FIG. 2 is a plan view of the eccentric rotor of the motor shown in FIG. 1.

More concretely, the eccentric rotor 3 is constructed such that as shown in FIG. 2, three air-core armature coils 3a, 3b and 3c are arranged eccentrically toward one side on the rear surface of a flat plate commutator 5 at an arrangement pitch of about 60°, and are made integral with the commutator 5, which is provided with spark quenching elements 4a, by a resin material 4 of a low friction factor. That is, the low friction factor resin itself serves as a bearing at the same time. Further, in the bracket 1 there is placed a ring-shaped magnet 6 contains neodymium and which confronts the rotor 3 leaving a certain space from the latter and inside a central opening of ring-shaped magnet 6 there are embedded a pair of brushes 7 and 7 at a sliding open angle of 90° so that the brushes 7 and 7 are brought into sliding contact with the flat plate commutator 5 with a suitable pressure contacting force.

On the other hand, a casing 8 which forms the other part of the housing includes at its center a tapering through hole 8a into which the other end of the above-described thin stainless steel shaft 2 is mounted. The eccentric rotor 3 is brought into sliding contact with the casing 8 by the pressure contacting force of the pair of brushes 7 and 7 by means of a ridge 3d and a polyester film washer P disposed around the through hole 8a. Consequently, the rotor 3 is constantly urged toward the casing 8 and rotatably pressed against the polyester film washer P so that there is no fear of the rotor 3 moving toward the casing 8 to rub against it. The rotor 3 can be rotatably supported in a stabilized manner while always keeping a predetermined gap from the casing 8 without varying the rotational position thereof.

Further, the ridge 3d is provided with a U-shaped or V-shaped groove which is concentric with the shaft 2 and which serves as a lubricant retaining means so that a lubricant such as grease can be maintained and a longer working life can be expected of the rotor.

The above-described assembling structure can be realized in a simple manner in which the rotor 3 prepared in advance is fitted in the bracket 1, also prepared in advance, from the open end of the shaft 2, the casing 8 is placed over the bracket 1 and assembled with the bracket 1 by caulking or welding the outer periphery of the bracket 1 to the open edge 8b of the casing 8.

Figure 3:
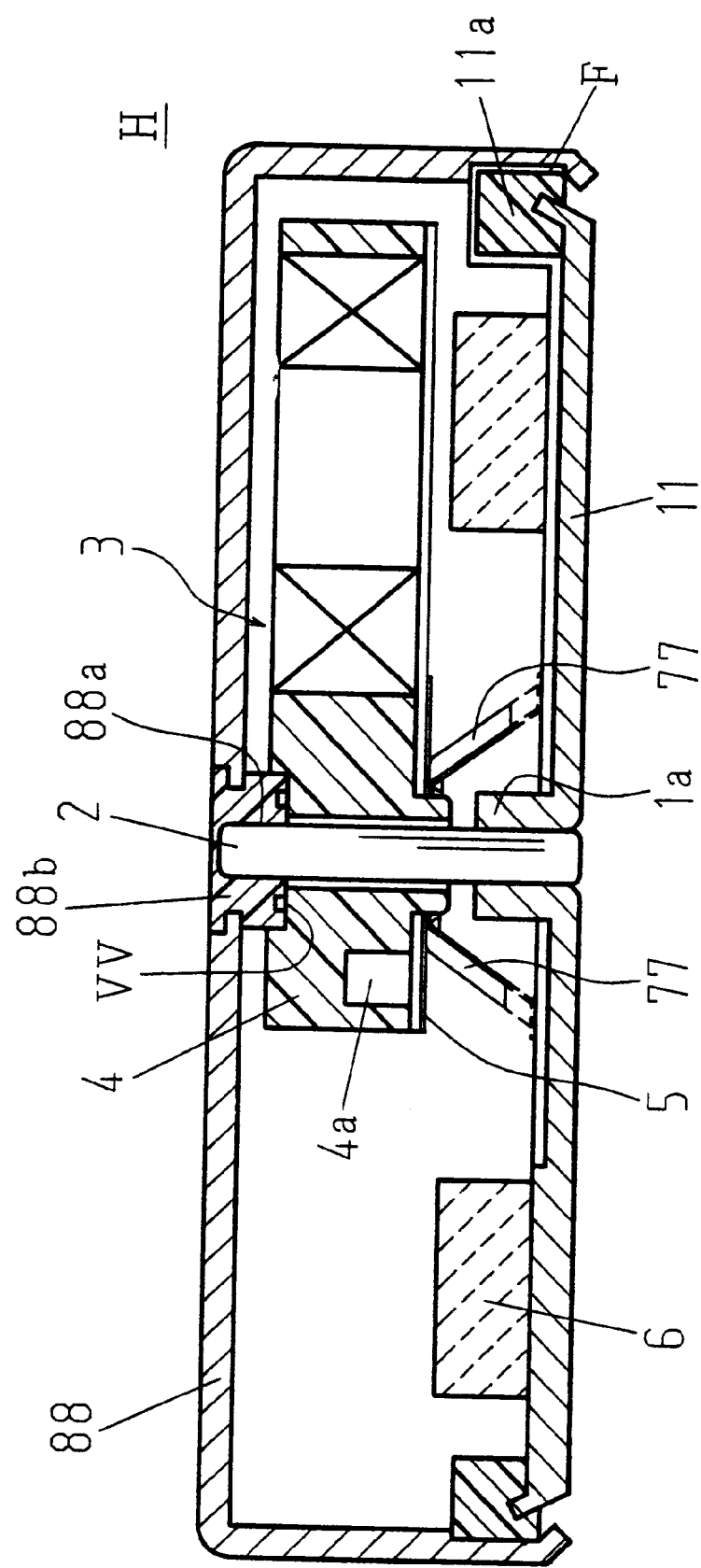
FIG. 3 is a sectional view of an essential portion of a first modification of the flat coreless vibrator motor shown in FIG. 1.

Further, as a modification of the instant embodiment there is shown in FIG. 3 a coin battery type vibrator motor having a casing and a bracket serving as current feeding electrodes.

In this modification, a concave portion 88a of a casing 88 for receiving the other end of the shaft 2 may be a resin material 88b having a good sliding property and an insulating means 11a, such as polyethylene terephthalate resin, may be outsert molded along the outer periphery of a bracket 11 so that the concave portion 88a is insulated from the casing 88 at the time of assembling the rotor. Further, in FIG. 3, reference symbol VV designates a V-shaped or U-shaped groove which is concentric with the shaft 2 and which serves as a lubricant retaining means disposed on the side of the resin 88b of good sliding property, facing a portion of the low frictional factor resin 4 of the rotor 3.

In the instant embodiment, in order to make the casing and the bracket serve as current feeding electrodes, one of the brushes 77 is directly soldered to the bracket 11 while the other brush 77 extends under the magnet 6 through a flexible plate F so as to be connected to the inside of the casing 88.

Figure 4:
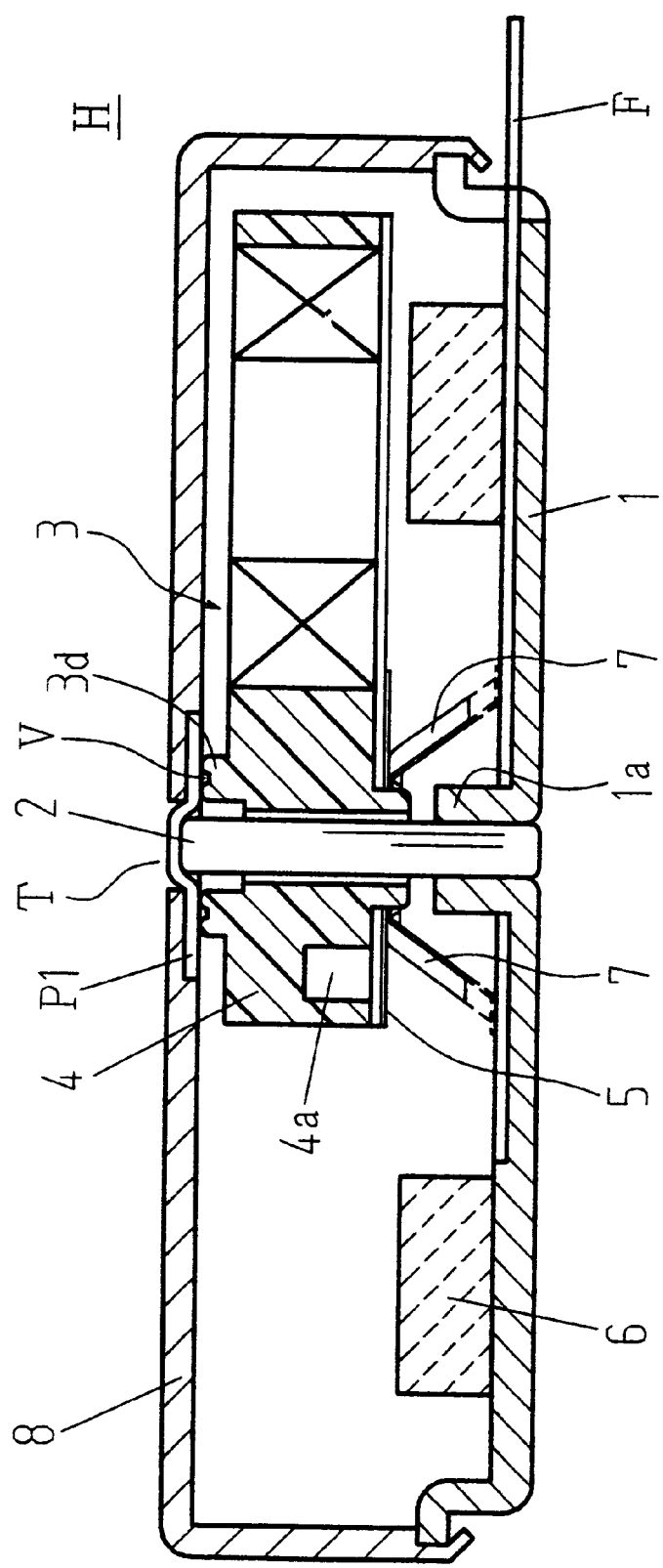
FIG. 4 is a sectional view of an essential portion of a second modification of the flat coreless vibrator motor shown in FIG. 1.

A further modification of the motor of FIG. 2 is shown in FIG. 4 in which the other end of the shaft 2 engages an adhesive polyester film P1 in a through hole T in the casing 8.

Further, in order to form the concave portion for receiving the other end of the shaft 2 for the insulating and sliding functions, the through hole T is drilled through the casing 8 to receive the shaft 2 the through hole T has a diameter a little larger than that of the shaft 2 so that the other end of the shaft 2 enters the through hole T by one half of the depth thereof and contacts the adhesive polyester film P1 covering around the through hole T.

In the above case, it is desirable that the portion of the casing 8 which surrounds the through hole T be recessed in such a manner that the thickness of the motor itself or the space provided in the casing is not sacrificed by the thickness of the adhesive polyester film P1 and then the film P1 be applied to the recessed portion.

By so doing, it is possible to obtain a structure capable of securing the insulating and sliding properties of the rotor without sacrificing the advantage of the motor being of small thickness. Accordingly, it goes without saying that the structure can be applied also to the above-described coin battery type motor.

Figure 5:
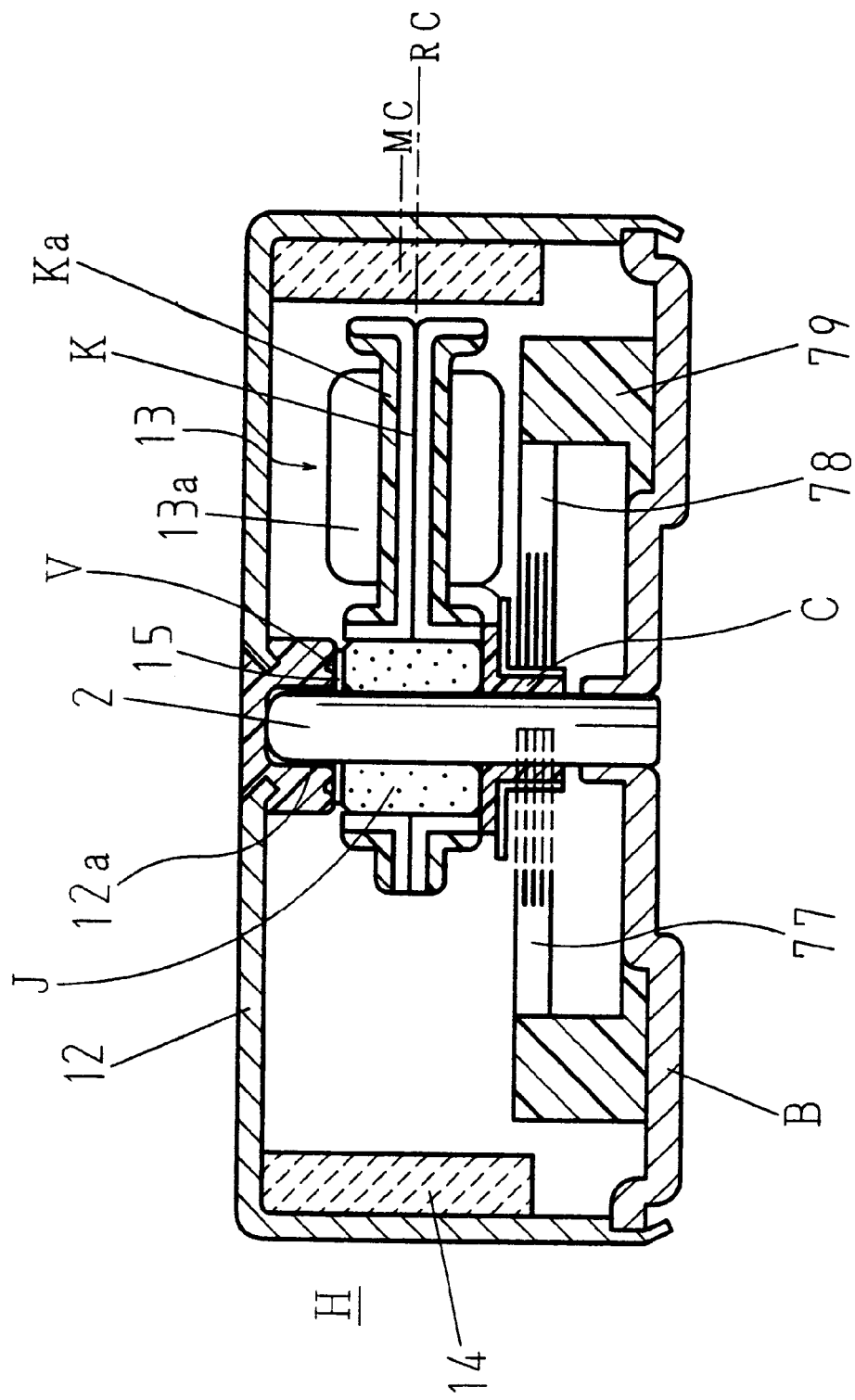
FIG. 5 is a sectional view of an essential portion of a flat vibrator motor according to a second embodiment of the present invention especially when the motor has a cored type eccentric rotor.
Figure 6:
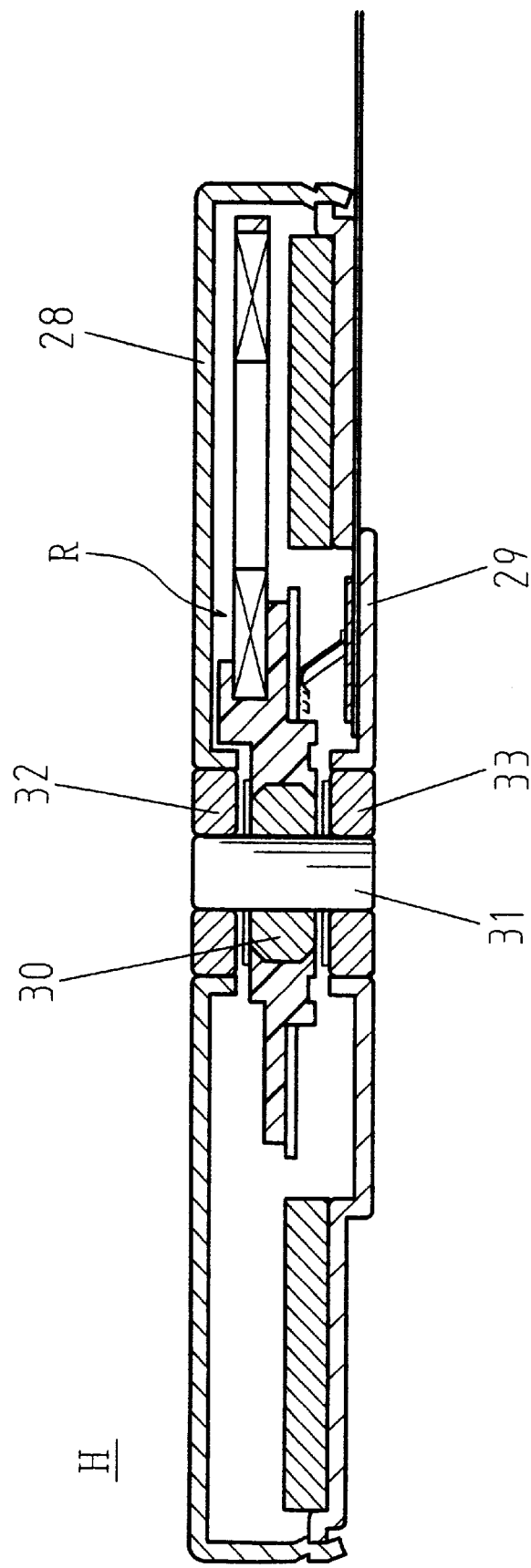
FIG. 6 is a sectional view of an essential portion of a conventional flat vibrator motor having no output shaft.

FIG. 5 is a sectional view of an essential portion of a shallow cored type flat vibrator motor having no output shaft according to a second embodiment of the present invention wherein reference numeral 12 designates a metallic dish-type casing with a bracket B fitted to an open edge thereof. As in the case of the first embodiment, to the bracket B there is pressure-fixed a small-diameter shaft 2. Further, to the shaft 2 a cored rotor 13, formed of two eccentric silicon steel plates K respectively bent outward at the outer peripheries thereof in opposite directions and an armature coil 13a wound around the plates, is rotatably mounted through a lubricant containing bearing J fitted inside. In addition, to the cored rotor 13, there is attached a cylindrical commutator C having a sliding surface C with which a pair of brushes 77 and 78 are brought into sliding contact. The base portion of each of the brushes is embedded in the bracket B through a synthetic resin brush base 79. At the top of the dish-type casing 12 there is provided a concave portion 12a which is formed by outsert-molding a resin material having a good sliding property so that when the rotor is assembled, the other end of the shaft 2 is supported by this concave portion 12a.

Reference numeral 14 in FIG. 5 designates a cylindrical field magnet disposed in the casing 12 leaving a space from the cored rotor 13 with the magnetic center MC of the magnet being displaced from the center RC of the cored rotor 13 whereby the cored rotor 13 is always urged in the direction of the displacement. Accordingly, since the cored rotor 13 is constantly urged toward a slider 15, there is no fear of the rotor slipping off downward and the position of the rotor is stabilized.

Further, a core cover Ka made of a resin material may be extended inward so that it may serve as a resin bearing in lieu of the above-described lubricant containing bearing J.

By so doing, it becomes possible to bring the rotor into direct sliding contact with the ceiling portion of the casing 12 through such a resin bearing.

As a modification of the above-described second embodiment of the invention, it is, of course, possible to provide a battery type motor by eliminating the lead wires and terminals and causing the casing and the bracket to serve as electrodes, respectively. Further, one end of the shaft 2 may be fixed to the casing instead of the bracket.

Thus, even in the case of such embodiment, since the rotor lies at a position to which the center of gravity of the rotor has moved, a large centrifugal force generated at the time of rotation of the rotor so that the rotor acts as a vibrating motor.

As described above, according to the present invention, the rotor is rotatably mounted on the shaft from one end of the shaft whose other end is fixed to the housing, so that the rotor can be assembled from one side of the shaft in a simple manner thereby facilitating automation, and since the radial movement of the shaft can be prevented without enlarging the fixing portion of the end of the shaft, even if the diameter of the shaft is small, the shaft can withstand an impact at the time when the motor falls down, and the like. Further, since the rotor can be urged forward or rearward in the axial direction, the variation of rotational position of the rotor can be prevented so that the rotor can be rotatably supported in a stabilized manner without running against any other structural member.

Further, if the rotor is brought into sliding contact with the housing by the pressure force of the brushes as a means of urging the rotor, the rotor can be urged by only the spring pressure of the brushes so that the axial movement of the rotor can be controlled by a simple structure by making the effective use of the spring pressure of the brushes without increasing the number of parts.

Still further, in the case of the rotor, which is brought into sliding contact with the housing by the magnetic force of the magnet, it is possible to make the effective use of the attractive force between the rotor and the magnet.

It should be noted that the present invention can be carried out in a variety of modes without departing from the technical idea or characteristics thereof. Accordingly, any of the above-described embodiments is nothing but a mere illustration and should therefore be not interpreted limitatively. Further, the technical scope of the present invention is represented by the appended claims and is not bound by the text of the specification.

What is claimed is:

1. A flat vibrator motor having no output shaft, the motor comprising:
   a housing comprising a casing and a bracket;
   an eccentric rotor having a plurality of armature coils and disposed in the housing;
   a commutator attached to the rotor;
   a pair of brushes in sliding contact with the commutator;
   a magnet confronting and spaced from the rotor; and
   a shaft having a first end fixed to a portion of the housing, supporting the rotor, and a second end not projecting outside of the housing and fitted in a concave portion of the bracket for preventing radial movement of the shaft, wherein the eccentric rotor is rotatably mounted on the shaft, the eccentric rotor being brought into sliding contact with the housing when the shaft moves axially.

2. The flat vibrator motor having no output shaft as claimed in claim 1, wherein each of said brushes applies pressure to the commutator, urging the rotor toward the casing.

3. The flat vibrator motor having no output shaft as claimed in claim 2, including an insulating member having a favorable degree of slidability disposed at one of the ends of the shaft and the eccentric rotor slidingly contacts the insulating member.

4. The flat vibrator motor having no output shaft as claimed in claim 3, including lubricating agent retaining means disposed where the rotor is in sliding contact with the insulating member.

5. The flat vibrator motor having no output shaft as claimed in claim 3, wherein lubricating agent retaining means is disposed at each of portions where the pair of brushes are brought into sliding contact with the commutator.

6. The flat vibrator motor having no output shaft as claimed in claim 3, including lubricating agent retaining means comprising a groove concentric with the shaft and disposed on the rotor.

7. The flat vibrator motor having no output shaft as claimed in claim 3, including lubricating agent retaining means comprising a groove concentric with the shaft and disposed on the housing.

8. The flat vibrator motor having no output shaft as claimed in claim 2, including lubricating agent retaining means comprising a groove concentric with the shaft and disposed on the rotor.

9. The flat vibrator motor having no output shaft as claimed in claim 2, including lubricating agent retaining means comprising a groove concentric with the shaft and disposed on the housing.

10. The flat vibrator motor having no output shaft as claimed in claim 1, including an insulating member having a favorable degree of slidability disposed at one of the ends of the shaft and wherein the eccentric rotor slidingly contacts the insulating member.

11. The flat vibrator motor having no output shaft as claimed in claim 10, including lubricating agent retaining means disposed where the rotor is in sliding contact with insulating member.

12. The flat vibrator motor having no output shaft as claimed in claim 10, wherein lubricating agent retaining means is disposed at each of portions where the pair of brushes are brought into sliding contact with the commutator.

13. The flat vibrator motor having no output shaft as claimed in claim 10, including lubricating agent retaining means comprising a groove concentric with the shaft and disposed on the rotor.

14. The flat vibrator motor having no output shaft as claimed in claim 10, including lubricating agent retaining means comprising a groove concentric with the shaft and disposed on the housing.

15. The flat vibrator motor having no output shaft as claimed in claim 1, including lubricating agent retaining means comprising a groove concentric with the shaft and disposed on the rotor.

16. The flat vibrator motor having no output shaft as claimed in claim 1, including lubricating agent retaining means comprising a groove concentric with the shaft and disposed on the housing.

* * * * *